United States Patent
Nakajima et al.

(10) Patent No.: US 11,932,345 B2
(45) Date of Patent: Mar. 19, 2024

(54) LEANING-TYPE VEHICLE

(71) Applicant: KAWASAKI MOTORS, LTD., Akashi (JP)

(72) Inventors: Takeshi Nakajima, Akashi (JP); Hiroshi Ishii, Akashi (JP); Taro Iwamoto, Akashi (JP); Kazuya Nagasaka, Akashi (JP); Taichi Inaba, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/757,976

(22) PCT Filed: Dec. 9, 2020

(86) PCT No.: PCT/JP2020/045863
§ 371 (c)(1),
(2) Date: Jun. 24, 2022

(87) PCT Pub. No.: WO2021/131703
PCT Pub. Date: Jul. 1, 2021

(65) Prior Publication Data
US 2023/0058088 A1 Feb. 23, 2023

(30) Foreign Application Priority Data
Dec. 26, 2019 (JP) .................. 2019-236735

(51) Int. Cl.
*B62K 5/10* (2013.01)
*B62K 5/027* (2013.01)
(Continued)

(52) U.S. Cl.
CPC ............... *B62K 5/10* (2013.01); *B62K 5/027* (2013.01); *B62K 5/05* (2013.01); *B62K 5/08* (2013.01); *B62K 21/12* (2013.01)

(58) Field of Classification Search
CPC . B62K 5/10; B62K 5/027; B62K 5/05; B62K 5/08; B62K 21/12; B60B 35/04;
(Continued)

(56) References Cited

U.S. PATENT DOCUMENTS

| 4,761,018 A | * | 8/1988 | Abbruzzi | ............... B60G 7/005 280/124.145 |
| 2012/0267870 A1 | | 10/2012 | Mercier | |
| 2018/0066720 A1 | * | 3/2018 | Dilworth | ............. F16D 65/0062 |

FOREIGN PATENT DOCUMENTS

| CN | 203766876 U | * | 8/2014 | .......... B60B 35/003 |
| CN | 204688204 U | | 10/2015 | |

(Continued)

OTHER PUBLICATIONS

Piyabongkarn et al., "Active Direct Tilt Control for Stability Enhancement of a Narrow Commuter Vehicle", International Journal of Automotive Technology, 2004, vol. 5, No. 2, pp. 77-88.

*Primary Examiner* — Paul N Dickson
*Assistant Examiner* — Shams Dhanani
(74) *Attorney, Agent, or Firm* — Fay Kaplun & Marcin, LLP

(57) ABSTRACT

A leaning vehicle includes a vehicle body, a left wheel, a right wheel, left and right bearings, left and right axle, left arm, right arm, and lean mechanism. The left arm supports the left wheel from inside in a vehicle width direction. The right arm supports the right wheel from inside in the vehicle width direction. The lean mechanism causes the left wheel and the right wheel to lean about a front-rear direction as a rotation center when the vehicle body leans about the front-rear direction as a rotation center. The single bearing is inserted into a hub hole of the left wheel. The single bearing is inserted into a hub hole of the right wheel.

9 Claims, 9 Drawing Sheets

(51) Int. Cl.
*B62K 5/05* (2013.01)
*B62K 5/08* (2006.01)
*B62K 21/12* (2006.01)

(58) Field of Classification Search
CPC ... B60B 35/025; B60B 35/003; B60B 34/004; B60B 35/005; B60B 35/007; B60B 35/14
See application file for complete search history.

(56) References Cited

FOREIGN PATENT DOCUMENTS

| | | |
|---|---|---|
| EP | 1 362 779 A2 | 11/2003 |
| EP | 3000706 | 3/2016 |
| EP | 3153388 | 4/2017 |
| JP | 2006248289 A | 9/2006 |
| JP | 2012214109 A | 11/2012 |
| WO | 2015/002161 A1 | 1/2015 |

* cited by examiner

LEANING-TYPE VEHICLE

PRIORITY DATA

The present application is a 371 application of PCT Patent Application Serial No. PCT/JP2020/045863 filed on Dec. 9, 2020 which claims priority to Japanese Patent Application Serial No. 2019-236735 filed on Dec. 26, 2019. The disclosure of the above applications is incorporated herein by reference.

TECHNICAL FIELD

The present invention relates mainly to a leaning vehicle configured to lean a vehicle body when turning, for example.

BACKGROUND ART

In motorcycles, which is a general leaning vehicle, a front wheel is supported by a vehicle body via two bearings and an axle disposed side by side.

Patent Literature 1 (PTL 1) discloses a three-wheeled vehicle including two front wheels and one rear wheel. Each of the front wheels has a wheel formed a wheel hole (hub hole). Two bearings and a shaft member are inserted into the wheel hole. Accordingly, in the three-wheeled vehicle of PTL 1, the front wheel is supported by a vehicle body via the two bearings and an axle, that is the same as a typical motorcycle.

CITATION LIST

Patent Literature

PTL 1: International Publication WO 2015/002161

SUMMARY OF INVENTION

As described above, in the leaning vehicle, the front wheel is supported by the vehicle body via two bearings and the axle. However, the configuration may increase the number of parts and an axis length of the hub hole.

The present invention relates to a leaning vehicle in which front wheels can be supported by a vehicle body with a simple configuration.

Solution to Problem

The problem to be solved by the present invention is as above. The following describes solutions to the problem as well as advantageous effects thereof.

An aspect of the present invention provides a leaning vehicle having the following configuration. The leaning vehicle includes a vehicle body, a first wheel, a second wheel, a first bearing, a second bearing, a first axle, a second axle, a first supporter, a second supporter, and a lean mechanism. The first wheel is positioned on a first side in a vehicle width direction. The second wheel is positioned on a second side opposite to the first side in the vehicle width direction. The first bearing is inserted into a hub hole of the first wheel. The second bearing is inserted into a hub hole of the second wheel. The first axle is inserted into the first bearing. The second axle is inserted into the second bearing. The first supporter supports the first wheel from inside in the vehicle width direction. The second supporter supports the second wheel from inside in the vehicle width direction. The lean mechanism causes the first wheel and the second wheel to lean about a front-rear direction as a rotation center when the vehicle body leans about the front-rear direction as a rotation center. The first bearing is a single bearing inserted into the hub hole of the first wheel. The second bearing is a single bearing inserted into the hub hole of the second wheel.

Accordingly, the number of bearings can be reduced, an axis length of the hub hole can be reduced, or the like compared to a configuration in which bearings are inserted into both sides of the hub hole of the wheel in the vehicle width direction.

Advantageous Effects of Invention

According to the present invention, one of the advantages is that a leaning vehicle being capable of supporting front wheels to a vehicle body with a simple configuration can be made.

DETAILED DESCRIPTION

Hereinafter, embodiments of the present invention will be described with reference to the drawings. In the description below, a left-right direction of a leaning vehicle 1 is defined based on a direction in which a driver riding on the leaning vehicle 1 faces. While the leaning vehicle 1 is upright, therefore, a front-rear direction is coincident with a vehicle length direction, and the left-right direction is coincident with a vehicle width direction. An up-down direction or an upper-lower direction (vertical direction) is coincident with a height direction.

In the description below, the wording of A being attached to (supported by) B should be interpreted as showing not only a configuration in which A is directly attached to (supported by) B but also a configuration in which A is attached to (supported by) B with interposition of another member. The wording of A overlapping the center in the vehicle width direction means that an imaginary line passing through the center of the leaning vehicle in the vehicle width direction overlaps A in a plan view or a front view, for example. The term "front portion" means a frontmost portion from among two or three portions into which the whole is divided in the front-rear direction (the same applies to a rear portion, etc.). Any description about the position of a member is based on a state where the leaning vehicle 1 is upright, a state where a steering angle is neutral, and a state where no load is applied except the dead load.

Figure 1:
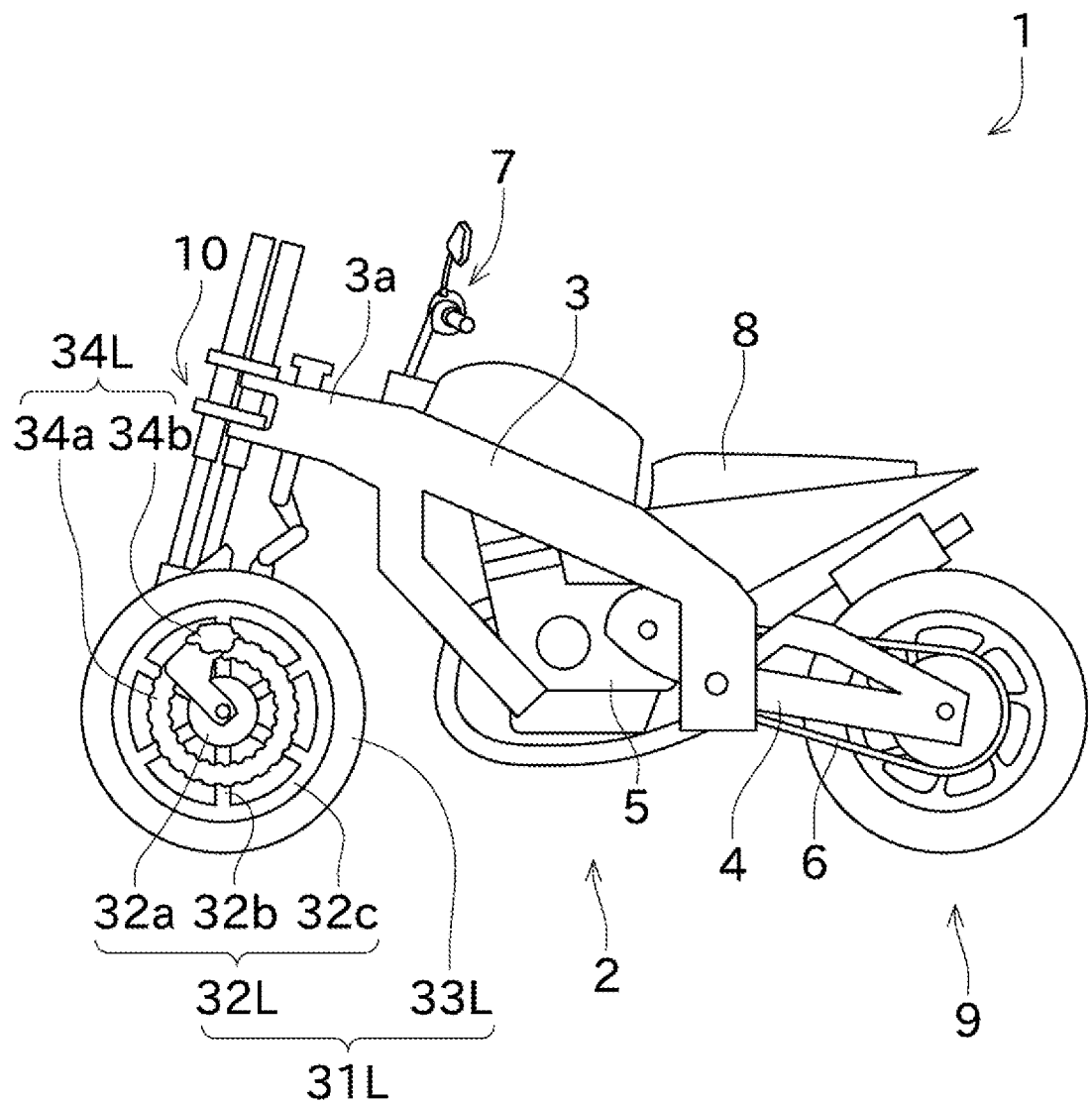
FIG. 1 shows a side view of a leaning vehicle according to a first embodiment of the present invention.
Figure 2:
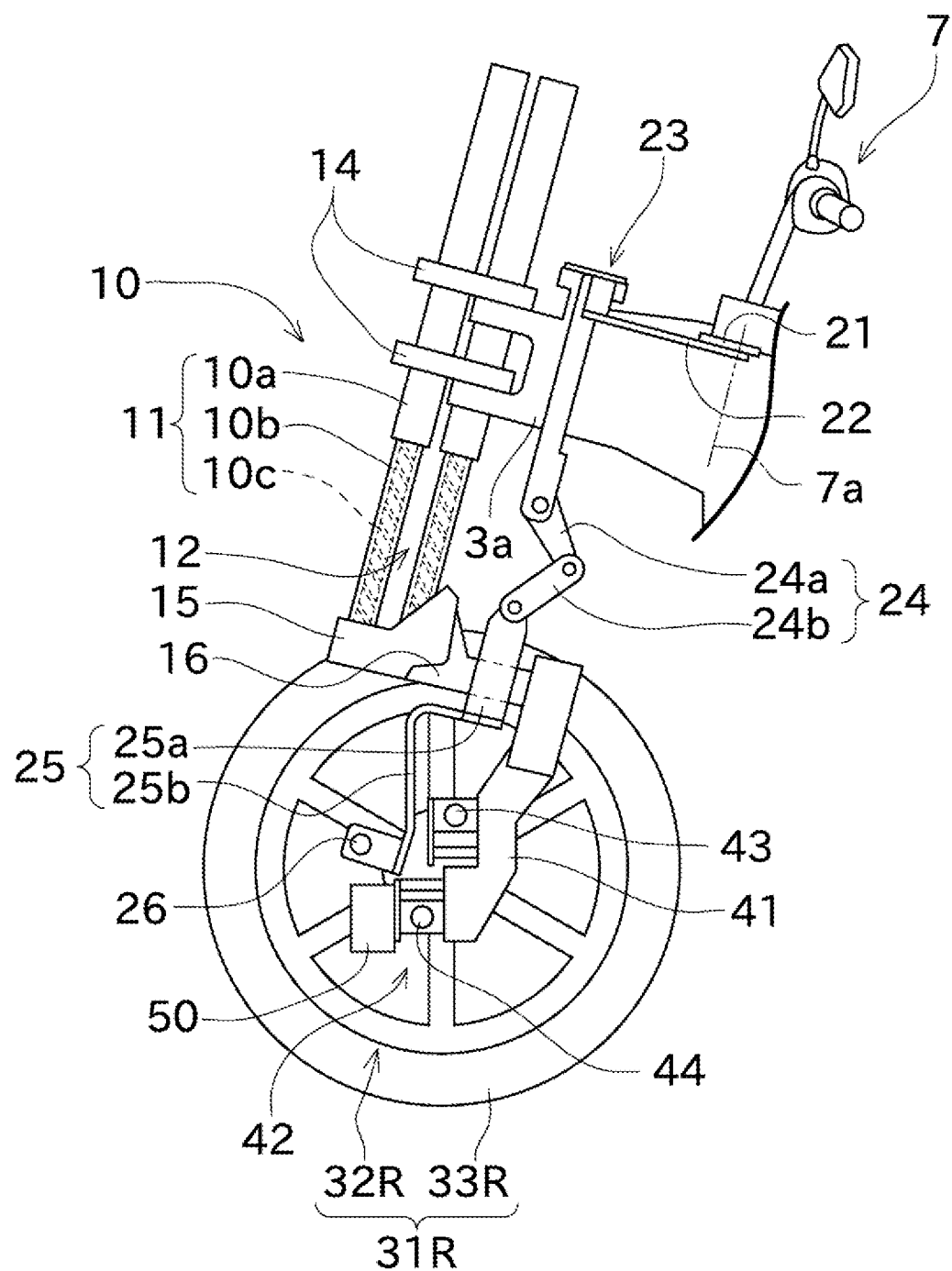
FIG. 2 shows a side view of a front portion of the leaning vehicle.

First, referring to FIG. 1 and FIG. 2, outline of the leaning vehicle 1 will be described.

The leaning vehicle 1 includes a vehicle body 2, a left front wheel (first front wheel) 31L, a right front wheel (second front wheel) 31R, and a rear wheel 9. The vehicle body 2 includes a vehicle body frame 3, which constitutes a framework of the leaning vehicle 1. The vehicle body frame 3 is composed of two or more frame elements coupled with a bolt or by welding, for example.

The left front wheel 31L is disposed on the left side (first side) relative to the center in the vehicle width direction. The right front wheel 31R is disposed on the right side (second side) relative to the center in the vehicle width direction. The left front wheel 31L and the right front wheel 31R are attached to the vehicle body frame 3. Details of how the left front wheel 31L and the right front wheel 31R are attached will be given later.

The rear wheel 9 is disposed at the center in the vehicle width direction. A swing arm 4 attached to a rear portion of the vehicle body frame 3 is capable of swinging up and down relative to the vehicle body frame 3. The rear wheel 9 is attached to the swing arm 4.

An engine 5 is attached to the vehicle body frame 3. The engine 5 is a drive source for making the leaning vehicle 1 travel. Power generated by the engine 5 is transmitted to the rear wheel 9 via a drive chain 6. In this manner, the leaning vehicle 1 can be made travel. Instead of or in addition to the engine 5, another drive source such as an electric motor for traveling may be provided. Alternatively, the engine 5 may be replaced with, for example, a pedal that allows the driver to apply power for traveling.

Attached to the vehicle body frame 3 is a steering handle 7 in the shape of a handlebar. In response to the driver applying a rotational steering force to the steering handle 7, the rotational steering force is transmitted to the left front wheel 31L and the right front wheel 31R via a later-described mechanism and a steering rod 26. This can consequently change an advancing direction of the leaning vehicle 1. Hereinafter, a change of the advancing direction of the leaning vehicle 1 may sometimes be referred to as a turn of the leaning vehicle 1. The later-described lean mechanism causes the leaning vehicle 1, when turning, to lean toward the center of the turning relative to a road surface. The steering handle 7 is not limited to a handlebar type one, and may be a steering wheel.

A seat 8 for the driver to sit thereon is disposed rearward of the steering handle 7. Steps (not shown) are disposed on a left side surface and a right side surface of the vehicle body 2, respectively. The driver straddling the seat 8 places his/her feet on the left and right steps. The leaning vehicle 1 is a vehicle (straddle vehicle) of a type having the seat 8 on which the driver sits astride.

Figure 3:
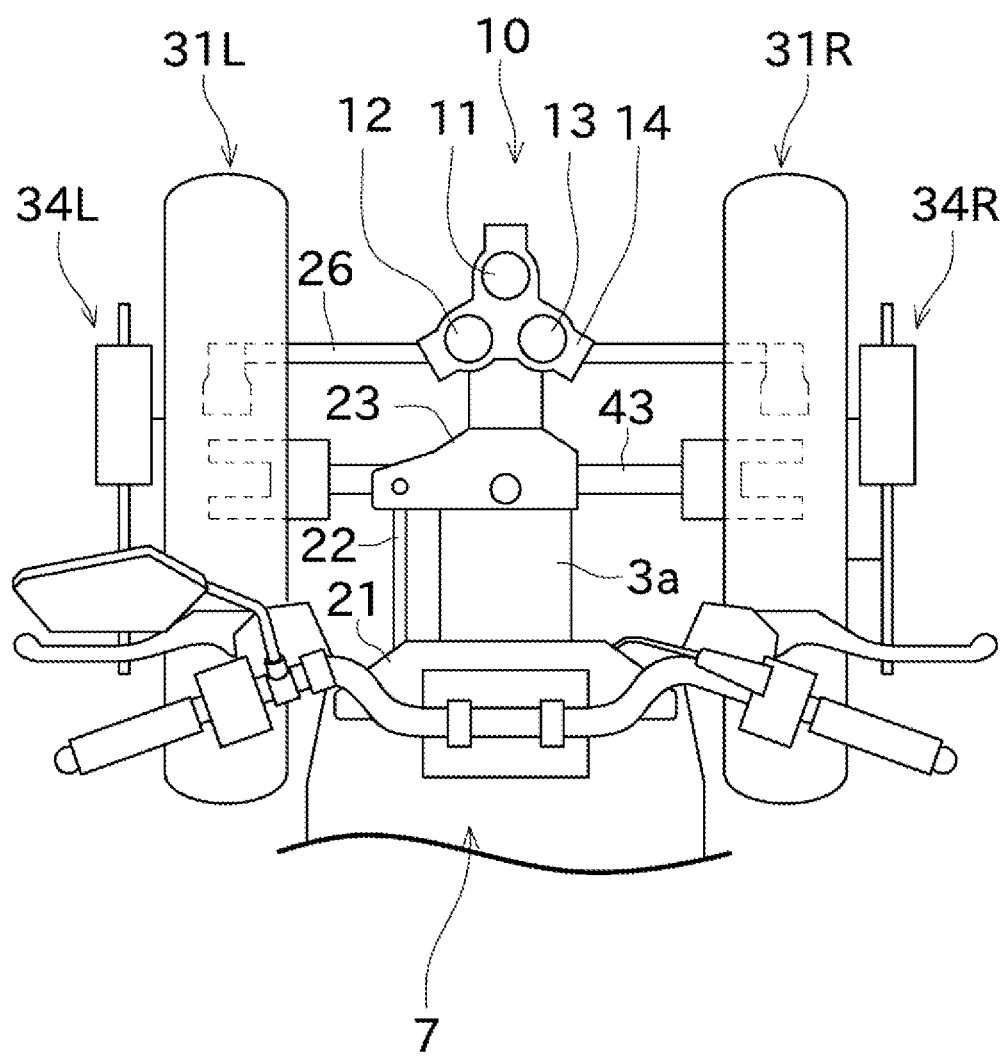
FIG. 3 shows a plan view of the front portion of the leaning vehicle.

A front suspension 10 included in the leaning vehicle 1 will now be described with reference to FIG. 2 and FIG. 3.

The suspension 10 couples the vehicle body 2 to the left front wheel 31L and the right front wheel 31R. The suspension 10 reduces vibrations that are transmitted to the vehicle body 2 in order that vibrations of the left front wheel 31L and the right front wheel 31R caused by, for example, unevenness of the road surface cannot be directly transmitted to the vehicle body 2. In the description below, a member attached on the side close to the left front wheel 31L and the right front wheel 31R (the side where vibrations occur) relative to the suspension 10 will be referred to as "vibration side member". A member attached on the side close to the vehicle body 2 (the side where vibration damping is made) relative to the suspension 10 will be referred to as "vibration-damping side member".

The suspension 10 includes a first tubular suspension 11, a second tubular suspension 12, and a third tubular suspension 13. In the following, the first tubular suspension 11, the second tubular suspension 12, and the third tubular suspension 13 will be collectively called "tubular suspensions 11, 12, and 13". The tubular suspensions 11, 12, and 13 have the same configuration. The configurations of the tubular suspensions 11, 12, and 13 are identical to the configuration of a front fork that is generally adopted in a motorcycle. The suspension 10 is not limited to a front fork type.

Each of the tubular suspensions 11, 12, and 13 includes a tubular body 10a, a sliding body 10b, and a spring 10c.

The tubular body (outer tube) 10a is an elongated tubular member. The tubular body 10a has the sliding body (inner tube) 10b received therein. The sliding body 10b is an elongated tubular member having a diameter smaller than that of the tubular body 10a. The sliding body 10b is capable of moving along its longitudinal direction relative to the tubular body 10a. The sliding body 10b has the spring 10c received therein. The tubular body 10a and the sliding body 10b are connected via the spring 10c. With this configuration, vibrations transmitted from the sliding body 10b to the tubular body 10a can be reduced. Oil is encapsulated in the suspension 10, and a movement of the sliding body 10b relative to the tubular body 10a causes a movement of the oil. The movement of the oil produces a resistance force (damping force), which can damp the vibrations in a short time.

In this embodiment, the tubular body 10a is disposed more upward than the sliding body 10b, and basically, the above-mentioned "vibration-damping side member" vibrates integrally with the tubular body 10a. The sliding body 10b is disposed more downward than the tubular body 10a. Basically, the above-mentioned "vibration side member" vibrates integrally with the sliding body 10b. Which one of the tubular body 10a and the sliding body 10b is disposed more upward or more downward than the other may be reversed.

The respective sliding bodies 10b of the tubular suspensions 11, 12, and 13 are configured to slide integrally. To be specific, the suspension 10 includes an upper coupling member 14 and a lower coupling member 15.

The upper coupling member 14 couples the respective tubular bodies 10a of the tubular suspensions 11, 12, and 13. This makes it impossible for the respective tubular bodies 10a of the tubular suspensions 11, 12, and 13 to move relative to one another, and thus the tubular bodies 10a can be integrated. At least one of the tubular bodies 10a of the tubular suspensions 11, 12, and 13 is attached to a front frame 3a disposed in a front portion of the vehicle body frame 3.

The lower coupling member 15 couples the respective sliding bodies 10b of the tubular suspensions 11, 12, and 13. This makes it impossible for the respective sliding bodies 10b of the tubular suspensions 11, 12, and 13 to move relative to one another, and thus allows the sliding bodies 10b to slide integrally. At least one of the sliding bodies 10b of the tubular suspensions 11, 12, and 13 is attached to a lower coupling base 16. The left front wheel 31L and the right front wheel 31R are attached to the lower coupling base 16 via the later-described mechanism.

Outline of the front wheel will now be described with reference to FIG. 1 and FIG. 2.

The left front wheel 31L and the right front wheel 31R are bilaterally symmetrical with respect to the center in the vehicle width direction. In the following, therefore, only the left front wheel 31L will be described, and a description about the right front wheel 31R (a right wheel 32R and a right tire 33R), a right brake 34R, and the like, will be omitted.

The left front wheel 31L includes a left wheel 32L and a left tire 33L. A left brake (front wheel brake mechanism) 34L is attached more outward than the left wheel 32L in the vehicle width direction. The left brake 34L applies braking to the left front wheel 31L by inserting a brake disc 34a, which is attached to the left wheel 32L, into a brake caliper 34b. It may be also acceptable that the left brake 34L is attached more inner side than the left wheel 32L in the vehicle width direction.

The left wheel 32L includes a hub 32a, a spoke 32b, and a rim 32c. The hub 32a has a hub hole in which an axle is received. The spoke 32b is shaped to extend outward from the hub 32a in a radial manner. The rim 32c is connected to the radially outer side of the spoke 32b, and the left tire 33L is attached to the rim 32c.

Attached to the left wheel 32L is a left arm 45 as a left knuckle member. An outer end portion of the above-mentioned steering rod 26 in the vehicle width direction is rotatably attached to the left arm 45. The steering rod 26 transmits a steering force to the left front wheel 31L via the left arm 45. The left arm 45 also constitutes a part of a lean mechanism which will be described later. That is, the left arm 45 of this embodiment is a part in which a knuckle member for changing an actual steering angle and a member for leaning the leaning vehicle 1 are unified.

A mechanism for transmitting a rotational steering force applied by the driver will now be described with reference to FIG. 2 and FIG. 3.

Disposed below the steering handle 7 is a rear bracket 21. The steering handle 7 and the rear bracket 21 are coupled by a fixture, for example. The steering handle 7 and the rear bracket 21 are integrally rotatable about a steering rotation axis 7a (a line substantially parallel to the upper-lower direction). A rotation angle of the steering handle 7 about the steering rotation axis 7a may sometimes be referred to as maneuvering angle.

The rear end of a transmission arm (rotation transmission part) 22 is rotatably attached to the rear bracket 21. The transmission arm 22 connects the rear bracket 21 to a first steering part 23. The transmission arm 22 transmits a rotational steering force applied to the steering handle 7 to the first steering part 23.

The first steering part 23 is disposed more frontward than the rear bracket 21 and the steering handle 7. The first steering part 23 is disposed so as to overlap the center in the vehicle width direction. Attached to the first steering part 23 is the front end of the transmission arm 22. This configuration allows the first steering part 23 to rotate as the steering handle 7 and the rear bracket 21 rotate.

Attached to the first steering part 23 is a pantograph mechanism 24. The pantograph mechanism 24 is positioned so as to overlap the center in the vehicle width direction. The pantograph mechanism 24 includes a first link portion 24a and a second link portion 24b. The first link portion 24a is attached to the first steering part 23 so as to be rotatable about the vehicle width direction. The second link portion 24b is attached to a later-described second steering part 25 so as to be rotatable about the vehicle width direction. The second steering part 25 is a "vibration side member". The first link portion 24a and the second link portion 24b are coupled to each other so as to be rotatable about the vehicle width direction.

With the configuration described above, the first steering part 23 and the second steering part 25 can be kept coupled even if a relative distance between the first steering part 23 and the second steering part 25 is changed. Accordingly, transmission of the rotational steering force remains enabled even though the suspension 10 expands or retracts because of, for example, unevenness of the road surface.

The second steering part 25 is positioned so as to overlap the center in the vehicle width direction. The second steering part 25 transmits a rotational steering force received via the pantograph mechanism 24 to the steering rod 26. The second steering part 25 includes a suspension attaching portion 25a and a rod attaching portion 25b.

The suspension attaching portion 25a is attached to the pantograph mechanism 24 (more specifically, to the second link portion 24b). The suspension attaching portion 25a is attached to the lower coupling base 16, too. The second steering part 25 rotates in accordance with steering, while the lower coupling base 16 does not rotate in accordance with steering. Accordingly, the second steering part 25 is attached so as to be rotatable relative to the lower coupling base 16.

The rod attaching portion 25b is attached to a lower portion of the suspension attaching portion 25a. The rod attaching portion 25b has a substantially L-like shape including a portion that extends frontward from the suspension attaching portion 25a and a portion that extends downward. With this configuration, a space can be formed below the suspension attaching portion 25a. In this space, a part of the later-described lean mechanism is disposed.

The steering rod 26 is rotatably attached to the rod attaching portion 25b. The longitudinal direction of the steering rod 26 is coincident with the vehicle width direction. The left end of the steering rod 26 is attached to the left front wheel 31L (more specifically, to a portion of the left front wheel 31L more frontward than the axle). The right end of the steering rod 26 is attached to the right front wheel 31R (more specifically, to a portion of the right front wheel 31R more frontward than the axle). A rotational steering force applied by the driver causes the rod attaching portion 25b to rotate about a predetermined rotation axis, so that the steering rod 26 moves left or right. As a result, the actual steering angle is changed. The actual steering angle is a direction of the left front wheel 31L and the right front wheel 31R (more specifically, a rotation angle about a substantially upper-lower direction). This is how the advancing direction of the leaning vehicle 1 can be changed in accordance with the driver's manipulation.

Figure 4:
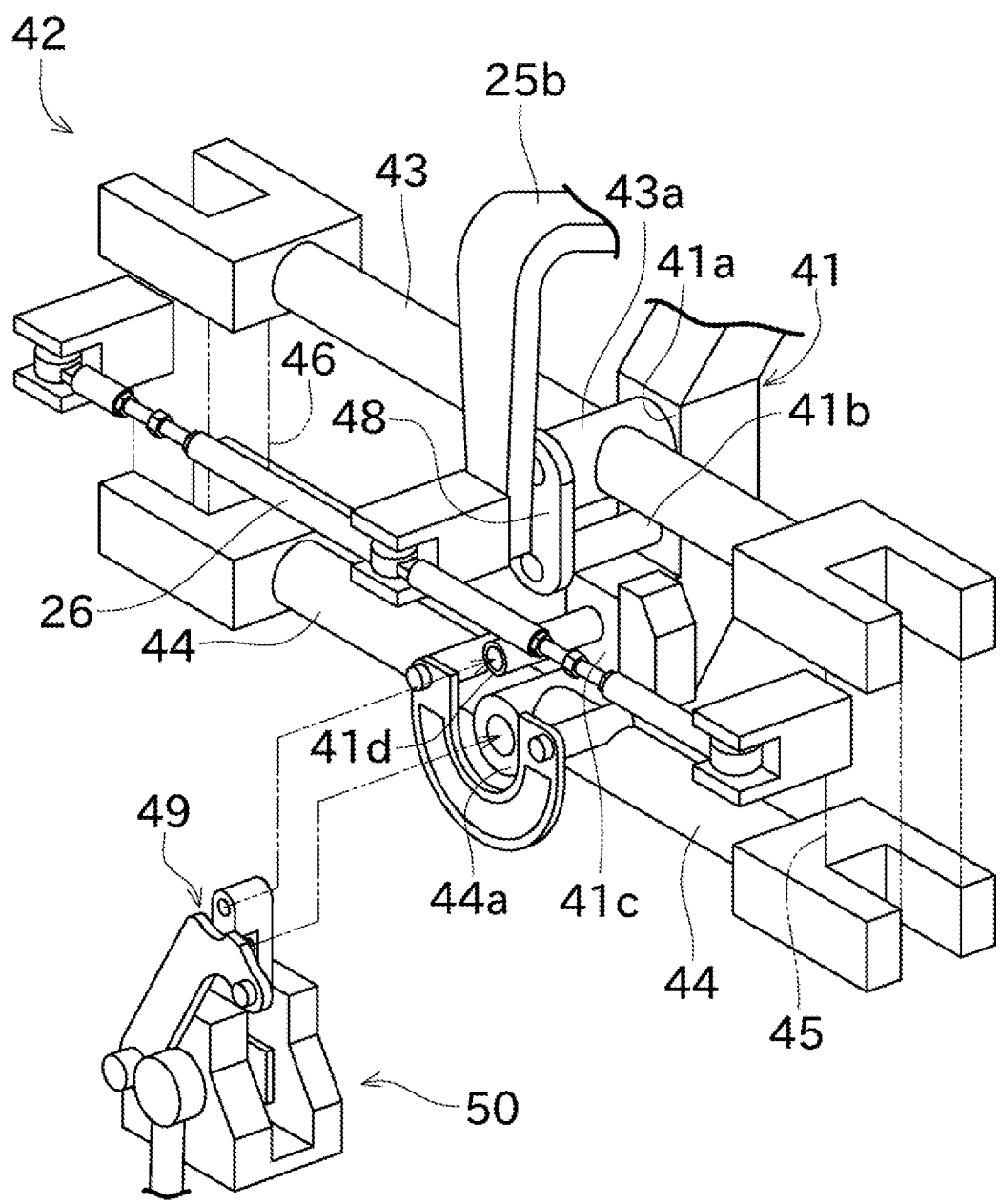
FIG. 4 shows a perspective view of a lean mechanism.
Figure 5:
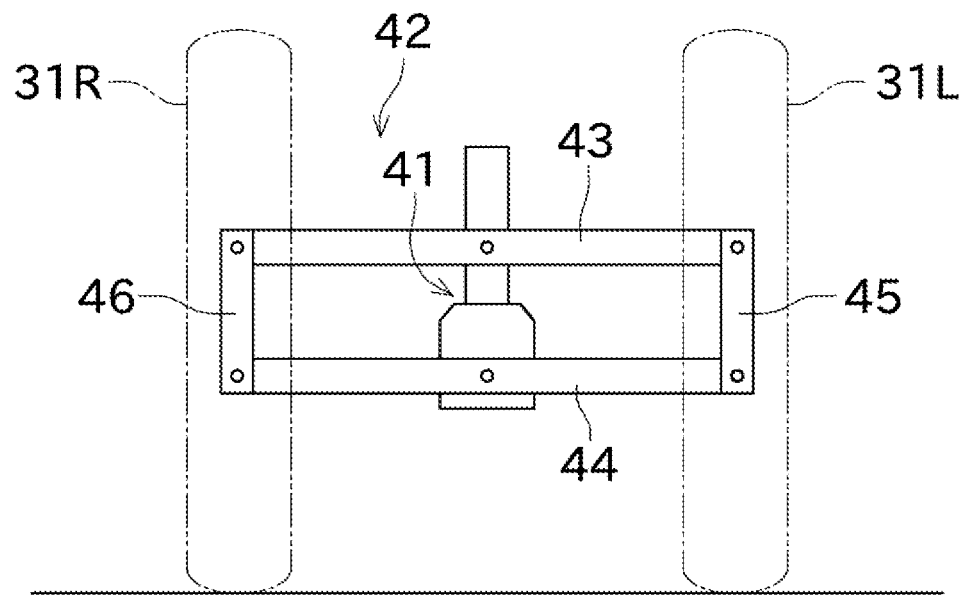
FIG. 5 a schematic front view illustrating a leaning operation.
Figure 5:
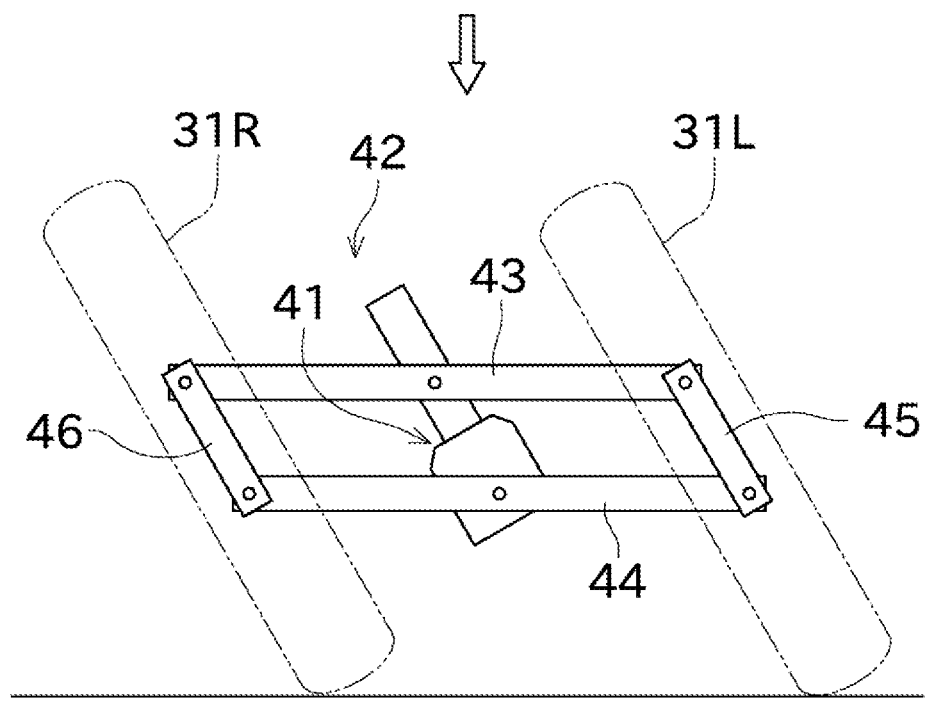

A lean mechanism 42 will now be described with reference to FIG. 4 and FIG. 5.

In the description of the lean mechanism 42, being rotatably attached means being attached so as to be capable of relative rotation about the front-rear direction.

Attached to a rear portion of the lower coupling base 16 is a lean base 41 extending downward from the lower coupling base 16. The lean base 41 is a member for supporting the lean mechanism 42 and also for coupling the lean mechanism 42 to the vehicle body 2 side (vehicle body frame 3 side). The lean base 41 is positioned so as to overlap the center in the vehicle width direction.

The lean base 41 and the lean mechanism 42, which are attached to the lower coupling base 16, are "vibration side members". The lean base 41 and the lean mechanism 42 are arranged at a relatively low position (a position where they are partially or entirely overlap the left front wheel 31L in a side view). With this, heavy parts can be arranged at a low position, and therefore the leaning vehicle 1 can be stabilized.

The lean base 41 includes an upper attaching portion 41a and a lower attaching portion 41c. The upper attaching portion 41a and the lower attaching portion 41c are formed on surfaces on the front side (one side in the front-rear direction, hereinafter the same). The upper attaching portion 41a is disposed more upward and more rearward than the lower attaching portion 41c. The upper attaching portion 41a has an upper protruding tube 41b protruding frontward. The lower attaching portion 41c has a lower protruding tube 41d protruding frontward. Here, it should be noted that the lean base 41 may have a configuration other than the first embodiment, as illustrated in a second embodiment which will be described later.

The lean mechanism 42 includes an upper arm 43, a lower arm 44, a left arm (first arm) 45, and a right arm (second arm) 46. The upper arm 43 is disposed more upward than the lower arm 44. The left arm 45 is rotatably coupled to the left end of the upper arm 43 and to the left end of the lower arm 44. The right arm 46 is rotatably coupled to the right end of the upper arm 43 and to the right end of the lower arm 44. The lean mechanism 42 is positioned so as to overlap the center in the vehicle width direction, and the left arm 45 and the right arm 46 are bilaterally symmetrical with respect to the center in the vehicle width direction.

The left end of the upper arm 43 has a bifurcated attaching portion. The upper arm 43 is attached to the left arm 45 in such a manner that the bifurcated attaching portion pinches an upper portion of the left arm 45 in the front-rear direction. This allows the left front wheel 31L to lean appropriately. The right end of the upper arm 43, and the left and right ends of the lower arm 44 also have bifurcated attaching portions in the same manner.

The upper arm 43 has, at its longitudinal center, an upper fulcrum portion 43a. The upper fulcrum portion 43a is a tubular portion whose axial direction is coincident with the front-rear direction. The upper fulcrum portion 43a is rotatably attached to the upper attaching portion 41a. The upper fulcrum portion 43a has the front end to which a coupling link 48 is rotatably attached. The coupling link 48 is rotatably attached not only to the front end of the upper fulcrum portion 43a but also to the front end of the upper protruding tube 41b. As a result, the upper arm 43 can be supported in a manner of being sandwiched between the lean base 41 and the coupling link 48 in the front-rear direction, so that the upper arm 43 can be supported more stably as compared to cantilevered supporting. The upper protruding tube 41b and the coupling link 48 may be omitted.

The lower arm 44 is attached in the same manner as the upper arm 43 is. To be specific, the lower arm 44 has, at its longitudinal center, a lower fulcrum portion 44a. The lower fulcrum portion 44a is a tubular portion whose axial direction is coincident with the front-rear direction. The lower fulcrum portion 44a is rotatably attached to the lower attaching portion 41c. The lower fulcrum portion 44a has the front end to which a lean bracket 49 is rotatably attached. The lean bracket 49 is rotatably attached not only to the front end of the lower fulcrum portion 44a but also to the front end of the lower protruding tube 41d. As a result, the lower arm 44 can be supported in a manner of being sandwiched between the lean base 41 and the lean bracket 49 in the front-rear direction, so that the lower arm 44 can be supported more stably as compared to cantilevered supporting.

The lean bracket 49 of this embodiment has a function for attaching not only the lower arm 44 but also another mechanism involved in leaning (e.g., a part of a lean brake mechanism 50) to the lean base 41. The lean brake mechanism 50 is a mechanism for breaking a leaning operation. The lean brake means generating a resistance force on the leaning operation to make the leaning operation less likely to occur or to reduce the lean angle. The lean bracket 49 may be a member (a member like the coupling link 48) for attaching the lower arm 44 alone.

Both the upper protruding tube 41b and the lower protruding tube 41d are positioned more downward than the upper arm 43 and more upward than the lower arm 44. This allows the lean mechanism 42 to have a reduced size in the upper-lower direction as compared to a configuration having the upper protruding tube 41b disposed more upward than the upper attaching portion 41a, for example.

The left arm 45 is rotatably attached to the left wheel 32L. To be specific, the left arm 45 is attached to the hub 32a of the left wheel 32L. The left arm 45 is fixed to the left wheel 32L such that the left arm 45 leans integrally with the left wheel 32L. Likewise, the right arm 46 is fixed to the hub 32a of the right wheel 32R.

The four arms constitute a parallel link. Accordingly, even in the leaning operation, the upper arm 43 and the lower arm 44 are kept parallel as shown in FIG. 5. The upper arm 43 rotates about the upper fulcrum portion 43a relative to the lean base 41. Likewise, the lower arm 44 rotates about the lower fulcrum portion 44a relative to the lean base 41. This is how the lean mechanism 42 rotates relative to the lean base 41.

Since the four arms constitute the parallel link, the left arm 45 and the right arm 46 are kept parallel even in the leaning operation. It therefore is possible that the left front wheel 31L and the right front wheel 31R lean with the same lean angle. The lean angle means the angle formed between a vehicle height direction of the leaning vehicle 1 and a direction perpendicular to the road surface.

The lean base 41 couples the longitudinal center (upper fulcrum portion 43a) of the upper arm 43 to the longitudinal center (lower fulcrum portion 44a) of the lower arm 44. Accordingly, the lean base 41 leans with the same lean angle as the left front wheel 31L and the right front wheel 31R do. In other words, the vehicle body 2 leans with the same lean angle as the left front wheel 31L and the right front wheel 31R do. The rear wheel 9 leans integrally with the vehicle body 2. In this manner, the leaning vehicle 1 is configured to be capable of leaning.

Figure 6:
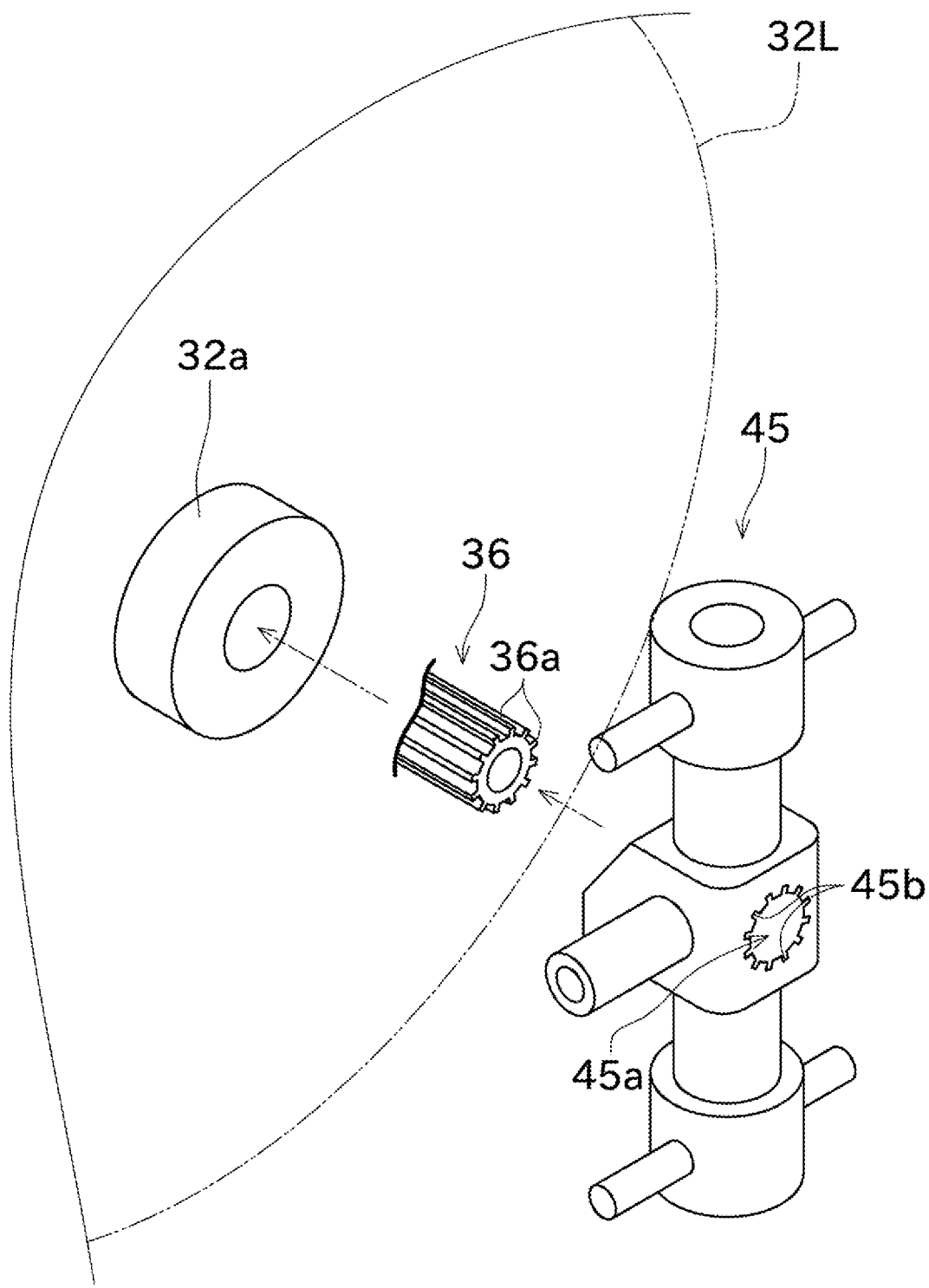
FIG. 6 a perspective view of a hub, an axle, a left arm.
Figure 7:
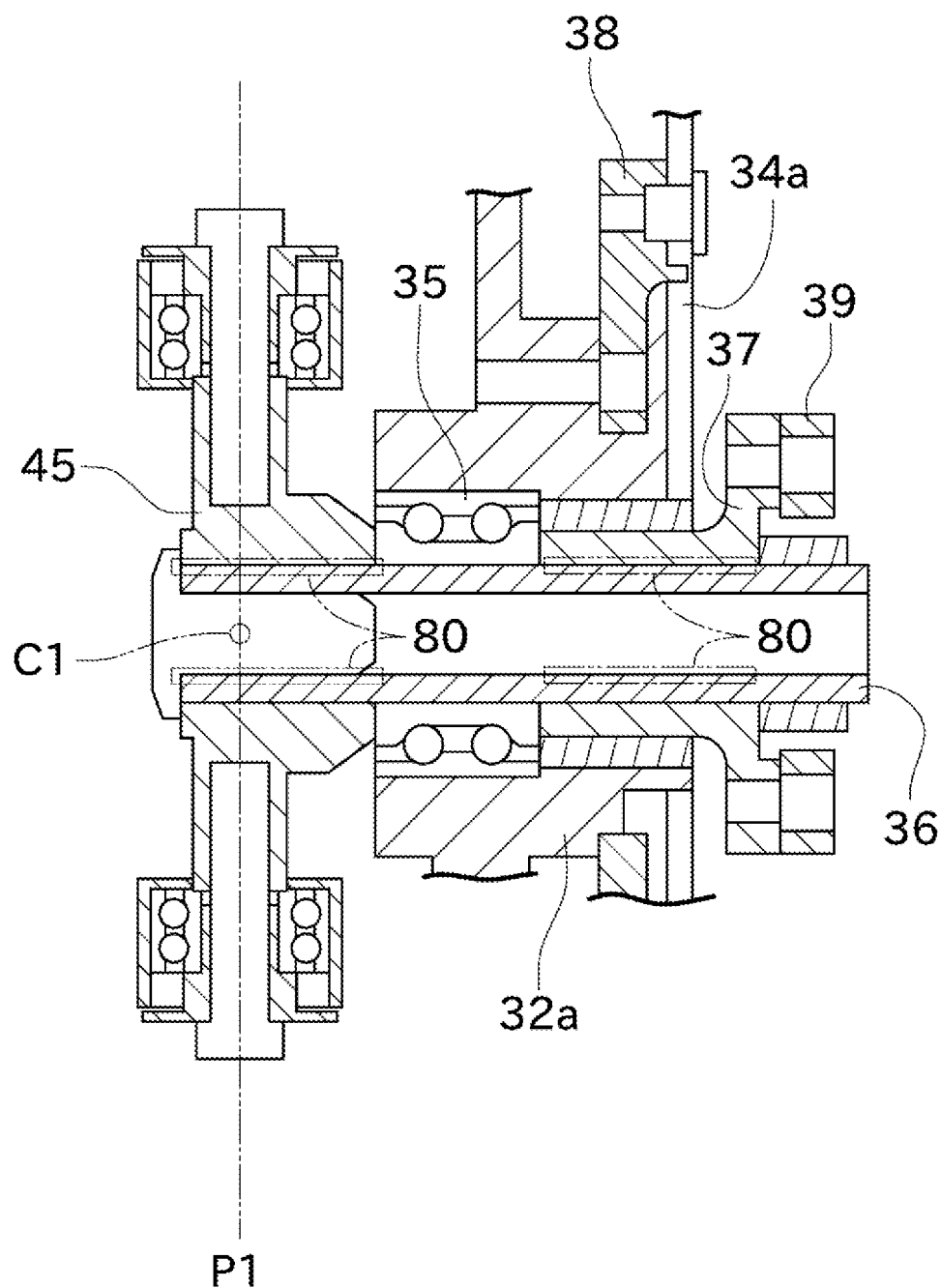
FIG. 7 shows a cross-sectional view obtained by cutting wheels and members attached thereof in a plain perpendicular to a front-rear direction.

Details of the left front wheel 31L and members attached thereof will now be described with reference to FIG. 6 and FIG. 7.

The parts attached to the left front wheel 31L and the parts attached to the right front wheel 31R are bilaterally symmetrical with respect to the center in the vehicle width direction. Thus, the parts attached to the left front wheel 31L will be mainly described in the following, and explanation of the parts attached to the right front wheel 31R may be simplified or omitted.

A bearing 35 and the axle 36 are attached to the left front wheel 31L.

The bearing 35 is inserted into the hub hole of the hub 32a. The bearing 35 are attached to the hub hole by using a press-fitting. The press-fit is performed from an inner side of the left wheel 32L of the vehicle width direction. Thus, the bearing 35 is positioned the left side (the inner side of the vehicle width direction) of the hub hole. In other words, the bearing 35 (in detail, a center of the bearing 35 in the vehicle width direction) is located the inner side than a center of the axis length (a length in the vehicle width direction) of the hub hole. Only the single bearing 35 is attached to the hub hole. The bearing 35 is a double-row type with a plurality of balls arranged side by side in an axial direction. The bearing 35 is an angular bearing in which balls and rings have a specified contact angle. This configuration allows the bearing 35 to take loads in a variety of directions. Instead of the bearing 35, other bearing having different configuration may be used.

In motorcycles, which is a general leaning vehicle, two bearings are inserted into the front wheel side by side in the vehicle width direction. This is because, in motorcycles, the front wheel is sandwiched between two front forks, and the front wheel cannot be supported stably without two bearings inserted in the front wheel.

In contrast, the left front wheel 31L and the right front wheel 31R are supported only in the inner side of the vehicle width direction, respectively, in this embodiment. Therefore, the left front wheel 31L or the right front wheel 31R can be supported stably even if the left front wheel 31L or the right front wheel 31R is supported by only the single bearing 35 inserted from the inner side in the vehicle width direction. Compared to a configuration in which two bearings are attached to one wheel, the number of parts can be reduced, the configuration can be simplified, and the length of the hub hole can be shortened.

The axle 36 is inserted into an inner ring of the bearing 35. The axle 36 is attached to the bearing 35 by a means of press-fitting or the like. The axle 36 is tubular-shaped. Projections 36a are formed on at least the outer surface of the axle 36. The projections 36a are formed along the axial direction. The projections 36a are formed over the circumferential direction. That is, the axle 36 is a hollow splined shaft. The projections 36a may be formed over the entire axial direction or only in the portion avoiding where the bearing 35 is located (i.e., the portion where the left arm 45 and mounting member 37, described below, are attached).

The axle 36 is attached so that the axle 36 is protrudes inner side and outer side from the bearing 35 in the vehicle width direction. The left arm (first supporter, first member, inner member) 45 is attached to the inner portion of the axle 36 in the vehicle width direction. The attaching member (first member, outer member) 37 is attached to the outer portion of the axle 36 in the vehicle width direction.

The left arm 45 is the knuckle member as described above and a part of the lean mechanism 42. The left arm 45 supports the left front wheel 31L from the inner side in the vehicle width direction via the axle 36 or the like. An attaching hole 45a for inserting the axle 36 is formed on the left arm 45. Grooves 45b are formed on the inner wall of the attaching hole 45a. The grooves 45b are correspond to the projections 36a and formed along the axial direction. The grooves 45 are formed over the circumferential direction.

With the grooves 45b and the projections 36a aligned, the axle 36 is inserted into the attaching hole 45a of the left arm 45. Thus, the left arm 45 and the axle 36 rotate integrally. In other words, when a structure that prevents the relative rotation of the left arm 45 and the axle 36 is called an anti-rotation structure 80, the left arm 45 and axle 36 are connected via the anti-rotation structure 80. Since the left arm 45 is attached to the hub 32a via the bearing 35, the axle 36 and the left arm 45 do not rotate even if the left front wheel 31L rotates.

The anti-rotation structure does not limit to above the grooves 45b and the projections 36a. For example, instead of the grooves 45b, a single groove (key groove) may be formed in the circumferential direction. In this case, instead of the projections 36a, a single projection may be formed in the circumferential direction. The projection may be formed on the left arm 45 side, and the groove may be formed on the axle 36 side. A configuration may also use a locking pin to prevent relative rotation.

The attaching member 37 supports the left front wheel 31L from the outer side in the vehicle width direction via the axle 36 or the like. The attaching hole and the groove are formed on the attaching member 37, as does the left arm 45. The axle 36 is also inserted into the attaching hole of the attaching member 37. Thus, the attaching member 37 is prevented from relative rotation by the anti-rotation structure 80 as does the left arm 45. Accordingly, the attaching member 37 and the axle 36 can rotate integrally. Since the attaching member 37 is attached to the hub 32a via bearing 35, the axle 36 and the attaching member 37 do not rotate even if the left front wheel 31L rotates.

A caliper bracket 39 is attached to the attaching member 37 by a fixture like a bolt or others. Thus, the attaching member 37 and the caliper bracket 39 rotate integrally. The brake caliper 34b is attached to the caliper bracket 39. On the other hand, a disk bracket 38 is attached to the hub 32a without the bearing 35. Thus, the disk bracket 38 and the left wheel 32L rotates integrally. The brake disc 34a is attached to the disk bracket 38. With the above configuration, the caliper bracket 39 and the disk bracket 38 rotate relative to each other while the leaning vehicle 1 is traveling. Thus, by operating the caliper bracket 39 and pressing the disk bracket 38 with the brake pad that is not shown, the brake can be actuated.

The left arm 45 and the attaching member 37 are positioned so that they sandwich the bearing 35 in the vehicle width direction. In this state, by attaching a bolt and a nut to the axle 36, the left arm 45 and the attaching member 37 are fixed. By the engagement of the grooves 45b and the projections 36a, the axle 36, the left arm 45, and the attaching member 37 rotate integrally.

Thus, an attaching angle (a rotation phase) of the left arm 45 and an attaching angle (a rotation phase) of the attaching member 37 are constantly same. That prevent from changing the attaching angle of the brake caliper 34b respect to the left arm 45, for example. Therefore, by adjusting the attaching angle of the left arm 45 as appropriate, the attaching angle of the caliper bracket 39 become appropriate, for example. Other parts except the caliper bracket 39 (parts for attaching a speed sensor, for example) may be attached to the attaching member 37.

A relationship between a rotation center position C1 of leaning of the left front wheel 31L and a tread width will now be described. The left front wheel 31L leans about a center of the left arm 45 in the longitudinal direction as a rotation center. Specifically, the rotation center of leaning of the left front wheel 31L (hereinafter, the rotation center position C1) is a center of a line segment connecting a connection position of the upper arm 43 and the left arm 45 with a connection position of the lower arm 44 and the left arm 45. If the rotation center position C1 is positioned away from a tire width center position P1, a distance of the left and right tires (the tread width) is changed, and then skid may be occurred.

However, a typical front wheel has a hub hole at a position overlapping the tire width center position P1, and a bearing is inserted into the hub hole. Thus, it is difficult to coincident the tire width center position P1 and the rotation center position C1.

On the other hand, in this embodiment, the hub 32a is positioned at the more outer side in the vehicle width direction than the tire width center position P1 of the left front wheel 31L, and the bearing 35 is positioned there. Thus, a member for leaning the left front wheel 31L (that is, the left arm 45) can be positioned so as to overlap the tire width center position P1. As a result, in this embodiment, the rotation center position C1 of the left front wheel 31L coincides with the tire width center position P1 of the left tire 33L. As described above, the right front wheel 31R, the right arm 46, and the like are symmetrical, therefore the rotation center position C1 in the right side also coincides with the tire width center position P1 in the right side. Accordingly, since the tread width changes little or not at all during leaning operation, skidding is unlikely to occur.

Figure 8:
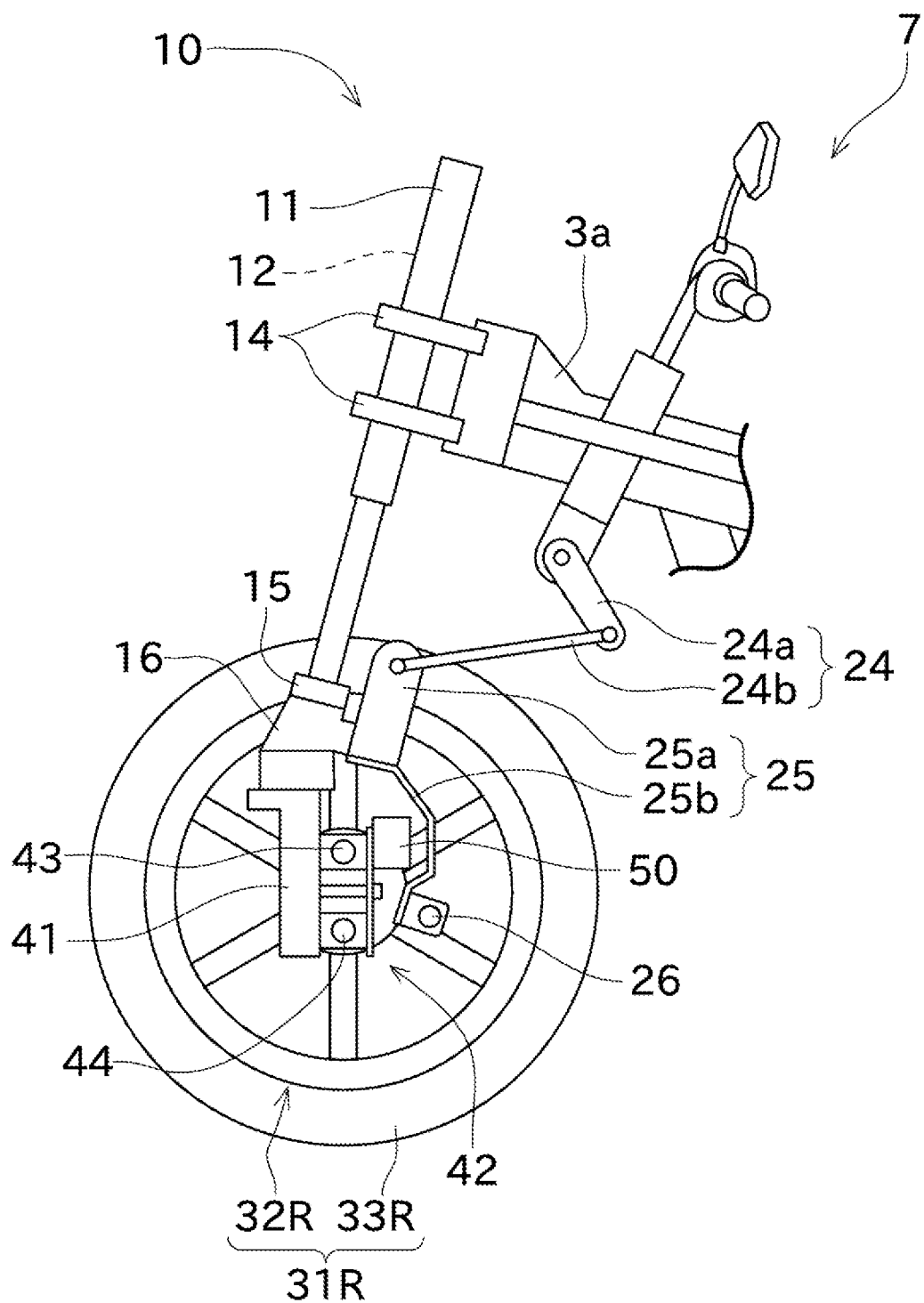
FIG. 8 shows a side view of a front portion of a leaning vehicle according to a second embodiment.

A leaning vehicle 1 according to the second embodiment will now be described with reference to FIG. 8 and FIG. 9.

The description of the second embodiment will mainly deal with configurations different from the first embodiment. In the description of the second embodiment, members identical or similar to those of the first embodiment are given the same reference signs on the drawings, and their descriptions may be omitted or simplified.

The suspension 10 of the first embodiment includes the three tubular suspensions 11, 12, and 13. A suspension 10 of the second embodiment, on the other hand, includes two tubular suspensions 11 and 12. The first tubular suspension 11 and the second tubular suspension 12 are disposed side by side in the vehicle width direction.

In the first embodiment, the rotational steering force of the steering handle 7 is transmitted to the pantograph mechanism 24 via the first steering part 23. In the second embodiment, on the other hand, a rotational steering force of a steering handle 7 is directly transmitted to a pantograph mechanism 24. Thus, the pantograph mechanism 24 is attached to a member that rotates coaxially with the steering handle 7.

In the second embodiment, a lower coupling base 16 does not cross a second steering part 25, and a lean base 41 is positioned immediately below the lower coupling base 16. An upper arm 43 and a lower arm 44 are positioned more rearward than the lean base 41. With this, a steering rod 26 and a lean brake mechanism 50 are also positioned more rearward than the lean base 41. In this manner, arranging members involved in leaning and steering on one side (on the front side in the first embodiment, and on the rear side in the second embodiment) of the lean base 41 allows the members involved in leaning and steering to be arranged collectively.

Figure 9:
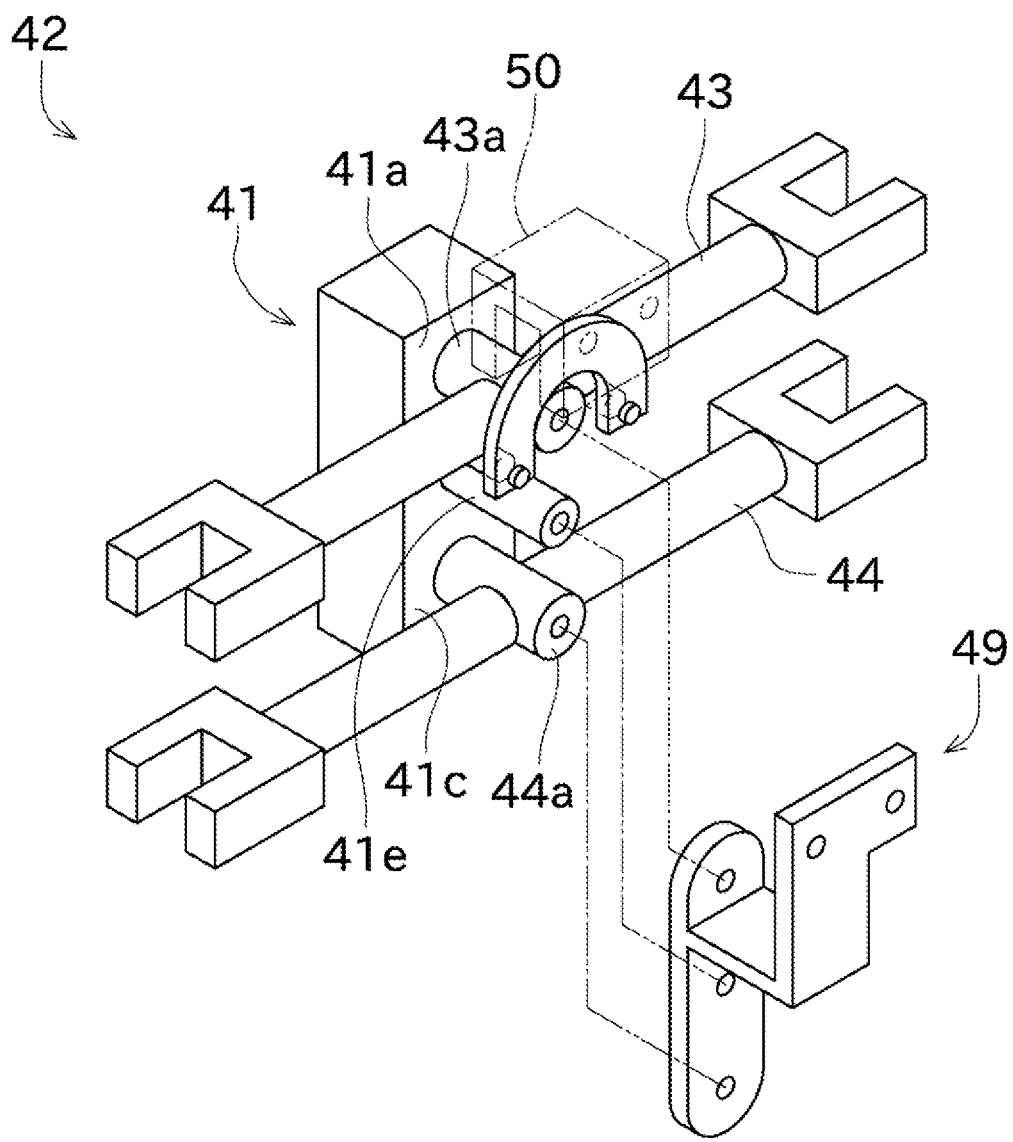
FIG. 9 shows a perspective view of a lean mechanism according to the second embodiment.

As shown in FIG. 9, a structure for attaching the upper arm 43 and the lower arm 44 is also different from that of the first embodiment. In the first embodiment, the upper attaching portion 41a and the lower attaching portion 41c of the lean base 41 are at different positions in the front-rear direction. In the second embodiment, an upper attaching portion 41a and a lower attaching portion 41c are at the same position in the front-rear direction. Accordingly, the upper arm 43 and the lower arm 44 are at the same position in the front-rear direction.

Although in the first embodiment, the lean base 41 has the upper protruding tube 41b and the lower protruding tube 41d, both of their functions are provided by a middle protruding tube 41e in the second embodiment. Thus, a lean bracket 49 attaches an upper fulcrum portion 43a, the middle protruding tube 41e, a lower fulcrum portion 44a, and the lean brake mechanism 50 collectively to the lean base 41.

As thus far described, the leaning vehicle 1 of any of the foregoing embodiments includes the vehicle body 2, the left wheel (first wheel) 32L, the right wheel (second wheel) 32R, the left and right bearings (first bearing and second bearing) 35, the left and right axle (first axle and second axle) 36, the left arm 45, the right arm 46, and the lean mechanism 42. The left wheel 32L is positioned on the first side (left side) in the vehicle width direction. The right wheel 32R is positioned on the second side (right side) opposite to the first side in the vehicle width direction. The bearing 35 of the left side is inserted into the hub hole of the left wheel 32L. The bearing 35 of the right side is inserted into the hub hole of the right wheel 32R. The axle 36 of the left side is inserted into the bearing 35 of the left side. The axle 36 of the right side is inserted into the bearing 35 of the right side. The left arm (first supporter) 45 supports the left wheel 32L from inside in the vehicle width direction. The right arm (second supporter) 46 supports the right wheel 32R from inside in the vehicle width direction. The lean mechanism 42 causes the left wheel 32L and the right wheel 32R to lean about the front-rear direction as the rotation center when the vehicle body 2 leans about the front-rear direction as the rotation center. The bearing inserted into the hub hole of the left wheel 32L is a single bearing 35. The bearing inserted into the hub hole of the right wheel 32R is a single bearing 35.

Accordingly, the number of bearings 35 can be reduced, the axis length of the hub hole can be reduced, or the like compared to the configuration in which bearings are inserted into both sides of the hub hole of the right and left wheels in the vehicle width direction, respectively.

In the leaning vehicle 1 according to any of the foregoing embodiments, the center of the axis length of the bearing 35 of the left side is more inner side than the center of the axis length of the hub hole of the left wheel 32L in the vehicle width direction. The center of the axis length of the bearing 35 of the right side is more inner side than the center of the axis length of the hub hole of the right wheel 32R in the vehicle width direction.

Accordingly, since the bearing 35 is positioned so as to be closer to the inner side of the vehicle width direction (side where the wheel is supported), the wheel can be stabilized.

The leaning vehicle 1 according to any of the foregoing embodiments includes the left tire (first tire) 33L and the right tire (second tire) 33R. The left tire 33L is attached to the left wheel 32L. The right tire 33R is attached to the right wheel 32R. The bearing 35 of the left side is positioned more outer side than the tire width center position P1 of the left tire 33L in the vehicle width direction. The bearing 35 of the right side is positioned more outer side than the tire width center position P1 of the right tire 33R in the vehicle width direction. The lean mechanism 42 is positioned between the first bearing and the second bearing in the vehicle width direction.

Accordingly, since the left and right bearings 35 are positioned the position avoiding the tire width center position P1, the lean mechanism 42 can be positioned the position near the tire width center position P1. Thus, the rotation center position C1 and the tire width center position P1 can be closer together during the leaning operation. Therefore, the change of the tread width of the tires can be reduced during the leaning operation.

In the leaning vehicle 1 according to any of the foregoing embodiments, the rotation center position C1 for leaning the left wheel 32L by the lean mechanism 42 coincides with the tire width center position P1 of the left tire 33L. The rotation center position C1 for leaning the right wheel 32R by the lean mechanism 42 coincides with the tire width center position P1 of the right tire 33R.

Accordingly, the change of the tread width of the tires can be reduced during the leaning operation.

The leaning vehicle 1 according to any of the foregoing embodiments includes the left arm 45 or the attaching member 37 attached to the axle 36 of the left side. The axle 36 of the left side and the left arm 45 or the attaching member 37 are connected via the anti-rotation structure 80 for preventing the relative rotation.

This prevents the left arm 45 or the attaching member 37 from rotating relative to the axle 36 or enable the axle 36 and the left arm 45 or the attaching member 37 to rotate integrally.

The leaning vehicle 1 according to any of the foregoing embodiments includes the left arm 45 and the attaching member 37. The left arm 45 is positioned more inner side of the bearing 35 in the vehicle width direction. The attaching member 37 is positioned more outer side of the bearing 35 in the vehicle width direction. The anti-rotation structure 80 prevents the left arm 45, the attaching member 37, and the axle 36 from rotating relative to each other.

Accordingly, the position of the left arm 45 and the position of the attaching member 37 can be coincident.

In the leaning vehicle 1 according to any of the foregoing embodiments, the anti-rotation structure 80 includes the groove 45b and the projection 36a. The groove 45b is formed on the axle 36 along the axial direction. The projection 36a is formed on the left arm 45 and the attaching member 37 along the axial direction.

This allows the above effect to be achieved simply by attaching the left arm 45 and the attaching member 37 to the axle 36.

While some preferred embodiments of the present invention have been described above, the configurations described above may be modified, for example, as follows.

Features of the first and second embodiments described above may be combined in appropriate manners. For example, the number of tubular suspensions, the lean mechanism 42, or the like, illustrated in the second embodiment may be applicable to the first embodiment. The same is true for other features.

In the various mechanisms described above, the shape of a component, the layout of a component, the structure for attaching a component, the structure for transmitting power, and the like, are just examples, and other configurations may be adoptable. For example, the left arm 45 does not always need to serve as a component for transmitting a steering force. A component different from the left arm 45 may serve as the component for transmitting a steering force.

Although the foregoing embodiments illustrate an example in which the present invention is applied to the leaning vehicle 1 having two front wheels and one rear wheel, the number of wheels is not limited to this. Two rear wheels may be acceptable. In addition, the number of persons who can ride on the leaning vehicle 1 is not limited to one or two. Three or more persons may ride.

REFERENCE SIGNS LIST

1 leaning vehicle
2 vehicle body
7 steering handle
10 suspension
23 first steering part
24 pantograph mechanism
25 second steering part
31L left front wheel (first front wheel)
31R right front wheel (second front wheel)
32L left wheel (first wheel)
32R right wheel (second wheel)
42 lean mechanism
50 lean brake mechanism

The invention claimed is:

1. A leaning vehicle, comprising:
a vehicle body;
a first wheel positioned on a first side in a vehicle width direction;
a second wheel positioned on a second side opposite to the first side in the vehicle width direction;
a first bearing inserted into a hub hole of the first wheel;
a second bearing inserted into a hub hole of the second wheel;
a first axle inserted into the first bearing;
a second axle inserted into the second bearing;
a first supporter supporting the first wheel from inside in the vehicle width direction;
a second supporter supporting the second wheel from inside in the vehicle width direction; and
a lean mechanism configured to cause the first wheel and the second wheel to lean about a front-rear direction as a rotation center when the vehicle body leans about the front-rear direction as a rotation center,
wherein the first bearing is a single bearing inserted into the hub hole of the first wheel,
wherein the first bearing includes an inner portion and an outer portion, such that the first axle is attached to the inner portion of the first bearing, the first wheel is attached to the outer portion of the first bearing, and the first wheel rotates integrally with the outer portion of the first bearing relative to the vehicle body,
wherein the second bearing is a single bearing inserted into the hub hole of the second wheel, and
wherein the second bearing includes an inner portion and an outer portion, such that the second axle is attached to the inner portion of the second bearing, the second wheel is attached to the outer portion of the second hearing, and the second wheel rotates integrally with the outer portion of the second bearing relative to the vehicle body.

2. A leaning vehicle, comprising:
a vehicle body;
a first wheel positioned on a first side in a vehicle width direction;
a second wheel positioned on a second side opposite to the first side in the vehicle width direction;
a first bearing inserted into a hub hole of the first wheel;
a second bearing inserted into a hub hole of the second wheel;
a first axle inserted into the first bearing;
a second axle inserted into the second bearing;
a first supporter supporting the first wheel from inside in the vehicle width direction;
a second supporter supporting the second wheel from inside in the vehicle width direction; and
a lean mechanism configured to cause the first wheel and the second wheel to lean about a front-rear direction as a rotation center when the vehicle body leans about the front-rear direction as a rotation center,
wherein the first bearing is a single bearing inserted into the hub hole of the first wheel,
wherein the second bearing is a single bearing inserted into the hub hole of the second wheel, wherein a center of an axis length of the first bearing is more inner side than a center of an axis length of the hub hole of the first wheel in the vehicle width direction and wherein a center of an axis length of the second bearing is more inner side than a center of an axis length of the hub hole of the second wheel in the vehicle width direction, and wherein the first bearing is positioned entirely inside of the hub hole and the second bearing is positioned entirely inside of the hub hole.

3. A leaning vehicle, comprising:

a vehicle body;

a first wheel positioned on a first side in a vehicle width direction;

a second wheel positioned on a second side opposite to the first side in the vehicle width direction;

a first bearing inserted into a hub hole of the first wheel;

a second bearing inserted into a hub hole of the second wheel;

a first axle inserted into the first bearing;

a second axle inserted into the second bearing;

a first supporter supporting the first wheel from inside in the vehicle width direction;

a second supporter supporting the second wheel from inside in the vehicle width direction;

a lean mechanism configured to cause the first wheel and the second wheel to lean about a front-rear direction as a rotation center when the vehicle body leans about the front-rear direction as a rotation center;

a first tire attached to the first wheel; and a second tire attached to the second wheel, wherein the first bearing is a single bearing inserted into the hub hole of the first wheel, wherein the second bearing is a single bearing inserted into the hub hole of the second wheel, wherein the first bearing is positioned more outer side than a tire width center position of the first tire in the vehicle width direction, wherein the second bearing is positioned more outer side than a tire width center position of the second tire in the vehicle width direction, and wherein the lean mechanism is positioned between the first bearing and the second bearing in the vehicle width direction.

4. The leaning vehicle according to claim 3, wherein a rotation center in which the lean mechanism rotates the first wheel coincides with a center of a tire width of the first tire, and wherein a rotation center in which the lean mechanism rotates the second wheel coincides with a center of a tire width of the second tire.

5. The leaning vehicle according to of claim 1, further comprising:

a first member attached to the first axle, wherein the first axle and the first member are connected via an anti-rotation structure preventing relative rotation.

6. The leaning vehicle according to claim 5, wherein an inner member and an outer member of the first member are included, wherein the inner member is positioned more inner side of the first bearing in the vehicle width direction, wherein the outer member is positioned more outer side of the first bearing in the vehicle width direction, and wherein the anti-rotation structure prevents relative rotation of any two of the inner member, the outer member, and the first axle.

7. The leaning vehicle according to claim 5, wherein the anti-rotation structure includes:

a groove formed along an axial direction of one of the first axle and the first member, and a projection formed along an axial direction of the other of the first axle and the first member.

8. The leaning vehicle according to of claim 1, further comprising:

a disk bracket attached to a hub of each of the first wheel and the second wheel; and a brake disc attached to the disk bracket.

9. The leaning vehicle according to of claim 1, further comprising:

a first brake disc; and a first knuckle member, wherein, in a rotation axis direction of the first axle, the first knuckle member is positioned on a first side of the first bearing and the first brake disc is positioned on a second side of the first bearing.

* * * * *